(12) United States Patent
Dahlbäck et al.

(10) Patent No.: US 7,473,329 B2
(45) Date of Patent: Jan. 6, 2009

(54) METHOD, USE AND DEVICE CONCERNING CLADDING TUBES FOR NUCLEAR FUEL AND A FUEL ASSEMBLY FOR A NUCLEAR PRESSURE WATER REACTOR

(75) Inventors: Mats Dahlbäck, Västerås (SE); Lars Hallstadius, Västerås (SE)

(73) Assignee: Westinghouse Electric Sweden AB (SE)

( * ) Notice: Subject to any disclaimer, the term of this patent is extended or adjusted under 35 U.S.C. 154(b) by 559 days.

(21) Appl. No.: 10/533,467

(22) PCT Filed: Oct. 30, 2003

(86) PCT No.: PCT/SE03/01685

§ 371 (c)(1), (2), (4) Date: Apr. 29, 2005

(87) PCT Pub. No.: WO2004/040587

PCT Pub. Date: May 13, 2004

(65) Prior Publication Data

US 2006/0104402 A1     May 18, 2006

(30) Foreign Application Priority Data

Oct. 30, 2002 (SE) .................................... 0203198

(51) Int. Cl.
*C22F 1/18* (2006.01)
*G21C 19/00* (2006.01)
(52) U.S. Cl. ...................... 148/672; 376/261
(58) Field of Classification Search ................ 148/672; 376/261
See application file for complete search history.

(56) References Cited

U.S. PATENT DOCUMENTS 3,271,205 A * 9/1966 Murgatroyd et al. ........ 148/672

(Continued)

FOREIGN PATENT DOCUMENTS

EP     0 198 570     * 10/1986

(Continued)

OTHER PUBLICATIONS

Mallory-Sharon Metals Corp., Ashtabula, Ohio, "Zirconium Analysis by Production Control Quantometer" Analytical Chemistry (U.S.) Formerly Ind. Eng. Chem., Anal. Ed.; vol. 31, No. 11, pp. 1867-1868, Nov. 1, 1959.*

*Primary Examiner*—John P. Sheehan
*Assistant Examiner*—Jessee R. Roe
(74) *Attorney, Agent, or Firm*—Michaud-Duffy Group LLP

(57) ABSTRACT

A method of producing a cladding tube for nuclear fuel for a nuclear pressure water reactor includes forming a tube which at least principally consists of a cylindrical tube component of a zirconium-based alloy, where the alloying element, except for zirconium, which has the highest content in the alloy is niobium, wherein the niobium content in weight percent is between about 0.5 and about 2.4 and wherein no alloying element, except for zirconium and niobum, in the alloy, has a content which exceeds about 0.2 weight percent. The cladding tube is then annealed such that the tube component is partly but not completely recrystallized. The degree of recrystallization in the tube component is higher than about 40% and lower than about 95%. A fuel assembly for a nuclear pressure water reactor also has a plurality of such cladding tubes.

8 Claims, 1 Drawing Sheet

U.S. PATENT DOCUMENTS

| | | | |
|---|---|---|---|
| 3,607,639 A * | 9/1971 | Van Santen et al. | 376/438 |
| 4,718,949 A * | 1/1988 | Takase et al. | 148/672 |
| 4,775,428 A | 10/1988 | Bunel et al. | |
| 5,323,434 A * | 6/1994 | Lorek et al. | 376/435 |
| 5,648,995 A | 7/1997 | Mardon | |
| 5,844,959 A * | 12/1998 | Van Swam et al. | 376/412 |

FOREIGN PATENT DOCUMENTS

| | | |
|---|---|---|
| EP | 0198570 B1 | 10/1986 |
| EP | 1225243 A1 | 7/2002 |
| WO | WO 0161062 A1 | 8/2001 |

* cited by examiner

METHOD, USE AND DEVICE CONCERNING CLADDING TUBES FOR NUCLEAR FUEL AND A FUEL ASSEMBLY FOR A NUCLEAR PRESSURE WATER REACTOR

CROSS-REFERENCE TO RELATED APPLICATIONS

This application is entitled to the benefit of and incorporates by reference essential subject matter disclosed in International Application No. PCT/SE2003/001685 filed on Oct. 30, 2003 and Swedish Patent Application No. 0203198.7 filed on Oct. 30, 2002.

FIELD OF THE INVENTION

The present invention concerns cladding tubes for nuclear fuel for a nuclear pressure water reactor. More precisely, the invention concerns such cladding tubes which are formed of a Zr-based alloy which contains Nb. The invention concerns, inter alia, a method. According to the method, a tube is formed which at least principally consists of a cylindrical tube component of a Zr-based alloy, where the alloying element, except for Zr, which has the highest content in the alloy is Nb, wherein the Nb content in weight percent is between 0.5 and 2.4.

The invention also concerns a cladding tube as such, a use of a cladding tube and a fuel assembly for a nuclear pressure water reactor comprising such a cladding tube.

BACKGROUND OF THE INVENTION

Methods of the kind which is described above are known. With such methods, cladding tubes of Zr-based alloys which contain Nb are thus produced. For example, U.S. Pat. No. 5,648,995 describes such a method and a cladding tube of this kind.

When a cladding tube is used in a nuclear reactor, it contains nuclear fuel, usually in the form of pellets comprising enriched uranium, usually in the form of $UO_2$. The cladding tube with its content thus constitutes a fuel rod. Because of the very particular environment in which cladding tubes are used, different requirements must be fulfilled.

There are mainly two kinds of modern light water reactors: boiling water reactors (BWR) and pressure water reactors (PWR). In these kinds of reactors different conditions prevail which call for different requirements on the parts which form part of the reactors. In a PWR, the fuel rods are cooled mainly by water that is in a liquid phase under high pressure. In a BWR, the pressure is lower and the water which cools the fuel rods is evaporated such that the fuel rods are surrounded both by water in a liquid phase and in a steam phase. Furthermore, the fuel assemblies have different construction in a BWR and a PWR. In one kind of BWR, the fuel rods in a fuel assembly extend all the way between a top plate and a bottom plate which keep the fuel assembly together. In a PWR, on the other hand, the fuel rods are usually held in position with the help of spacers and do not reach all the way to the top plate and the bottom plate.

A fuel rod which is used in a nuclear reactor is exposed to high temperatures and pressures. Over time thereby creep phenomena occur. Such a creep should as far as possible be avoided since it can have negative effects. For example, a creep of the fuel rods may have as a consequence that they will press against the fuel pellets which are located therein. The neutron radiation to which a fuel rod is exposed when it is used may also have as a consequence that the fuel rod tends to grow with time. Also such a growth caused by neutron radiation may have undesired effects. It should therefore be avoided that the cladding tube grows to a larger extent. Modern fuel rods which are produced in suitable zirconium alloys and which undergo special heat treatments during the production often have a relatively low tendency to grow when they are exposed to neutron radiation. The tendency to grow may be reduced, inter alia in that the cladding tube during the production undergoes a final recrystallization anneal.

Through a suitable choice of the material for the cladding tube and a suitable method of production, the cladding tube can obtain suitable properties concerning for example hardness and ductility.

In the environment where the cladding tubes are used they may be subject to different corrosive attacks. These attacks may come from the outside or from the inside. The attacks from the inside often have their basis in an influence from the nuclear fuel material that is located there, so-called pellet-cladding interaction (PCI). If a crack is formed through the cladding tube (a so-called primary damage), water may penetrate in through the crack and spread along the inside of the tube. This may lead to new corrosive attacks from the inside of the tube, so-called secondary damages. A cladding tube of zirconium or zirconium-based alloys may also react with hydrogen such that hydrides are formed in the cladding tube. These hydrides may be formed from the inside of the tube, particularly if a crack has been formed such that water has penetrated into the tube. These hydrides make the tube more fragile and the probability for the formation of cracks increases. Particularly hydrides that extend in a radial direction through the tube constitute an increased risk for crack formation. Such radial hydrides may therefore speed up possible secondary damages and crack formations.

The complicated chemical, mechanical and metallurgical conditions that are the case in a nuclear reactor have lead to the fact that a very large number of suggestions have been proposed for the selection of materials and for the methods of production of cladding tubes. Even small changes in the composition of alloys or production parameters may have a large importance for the properties of the cladding tube.

SUMMARY OF THE INVENTION

Cladding tubes produced of a Zr-based alloy which contains Nb has appeared to have good properties in many respects. By suitable alloying contents (for example such as described in the above mentioned U.S. Pat. No. 5,648,995) and by a suitable choice of parameters of production, a cladding tube can be obtained which has good chemical, mechanical and metallurgical properties. It has however become clear that also for tubes of this kind there is a risk of damages.

An object of the present invention is therefore to achieve a method of producing a cladding tube, of a Zr-based alloy which includes between 0.5 weight percent and 2.4 weight percent Nb and which has an improved resistance against damages than prior cladding tubes of this kind of alloys.

These objects are achieved by a method characterized in that after that the cladding tube has been formed according to the above and after possible rolling steps with heat treatments between them, the cladding tube is finally annealed at a temperature and during a time such that said tube component is partly recrystallized but not completely recrystallized. The tube component is thus partially recrystallized (pRXA).

A cladding tube produced according to this method has appeared to have a good resistance against damages caused by PCI at the same time as the risk for the formation of radial hydrides is low. Thereby, the risk for cracks is reduced. The cladding tube has at the same time also a high ductility, a low creep rate and a low tendency to growth caused by neutron radiation. Further objects and advantages of the invention will become clear from the following.

Since the tube component is pRXA (and not completely recrystallized), it has become clear that hydrides which are formed tend to extend in mainly a tangential direction while the risk for radial hydrides is low. Thereby, an improved resistance against crack formation is obtained. The reason why radial hydrides are avoided is probably that certain tensions which originate from the production of the tube are maintained since the tube component is not completely recrystallized. These tensions have a consequence that the tendency for radial hydrides is reduced.

It can be noted that previously known cladding tubes of this kind of alloys have undergone a final anneal such that the cladding tube has become completely recrystallized (see for example the above mentioned U.S. Pat. No. 5,648,995). Such an RXA is advantageous in certain respects (for acting against creep and growth caused by neutron radiation and for achieving resistance against PCI damages). However, the inventors of the present invention have found that these advantages to a large extent can be obtained also if the cladding tube is only finally annealed for achieving pRXA. It has thus thereby become clear that an improved resistance against damages may be obtained through this final anneal.

It should be noted that the final anneal is normally the last heat treatment step in the method of production. Possibly, a certain after treatment of the cladding tube may be carried out, but such an after treatment should be such that the structure which is obtained through the final anneal is not essentially destroyed.

It should also be noted that according to a preferred embodiment, the cladding tube consists only of said tube component. There are thus no further layers. The composition of the outer surface and the inner surface of the tube may however differ from the composition in the inner of the tube, for example due to the substances that the tube has come into contact with. The tube may for example be oxidised through the fact that it has been kept in an environment of air. According to an alternative embodiment, it is however feasible that the tube comprises one or more further protective layers on its inside or its outside. In this case, the tube thus consists of several components. It is however always the case that said tube component constitutes the main component of the tube, for example that this tube component constitutes more than 60% of the thickness of the tube. As has been pointed out above, it is however preferred that the whole thickness of the tube is made up of said tube component.

As used herein % or ppm are used in connection with contents of different substances, it is, if nothing else is said, referred to weight percent of the respective substances.

According to a preferred manner of carrying out the method according to the invention, the final anneal is carried out such that the degree of recrystallization in the tube component is higher than 5% and lower than 95%, preferably higher than 40%, for example between 60% and 90%. It has become clear that such degrees of recrystallization are particularly suitable for achieving the described advantages.

The temperature and the time that are needed in order to achieve such a degree of recrystallization depend on the contents of the alloying elements. The temperature for the final anneal is preferably lower than 550° C., for example between 400° C. and 540° C., and often most preferred between 450° C. and 500° C. The final anneal may suitably be carried out during 1 h to 6 h, preferably during 1 to 3 hours.

According to a preferred manner, the method comprises, before said final anneal, the following steps:
a bar of said Zr-based alloy is formed;
this bar is heated to between 900° C. and 1300° C. and is thereafter quenched, preferably in water;
a billet is extruded from the bar after heating to between 500° C. and 900° C.;
the billet is cold rolled to a tube in at least two steps, with heat treatments between them at between 550° C. and 650° C.

Such a method of production is suitable in order to obtain favourable properties of the cladding tube. It should be noted that the method of production of course may comprise further steps (for example further heat treatments or cold rolls) in addition to those mentioned above.

According to a preferred manner, the Nb-content in said alloy is between 0.8 weight percent and 1.2 weight percent. Preferably, no alloying element, except for Zr and Nb, in said alloy has a content which exceeds 0.3 weight percent, and preferably not above 0.2 weight percent.

The alloy may suitably contain between 800 ppm and 1700 ppm O. Such a selection of the content of O leads to the fact that the cladding tube has good creep properties.

According to an advantageous embodiment, the alloy contains between 50 ppm and 600 ppm Fe. By keeping the content of Fe low, the creep properties are further improved. The Fe-content may for example be lower than 250 ppm. It should be noted that these low Fe-contents are only preferred embodiments of the invention. According to another embodiment, also a higher Fe-content may be permitted. The alloy may also contain a certain amount of S, for example between 20 ppm S and 600 ppm S, or between 100 ppm S and 600 ppm S. Such an amount of S can improve the corrosion resistance of the alloy and the creep properties.

According to a preferred embodiment, said alloy contains, in addition to Zr, 0.8 weight percent to 1.2 weight percent Nb, 50 ppm to 600 ppm Fe, 800 ppm to 1700 ppm O, less than 250 ppm C, less than 150 ppm Si, less than 1000 ppm S and in addition to that only impurities of a content which does not exceed that which is normally accepted in Zr or Zr alloys for applications in nuclear reactors.

Examples of what is considered as acceptable impurities in this context are mentioned for example in the patent document EP 0 674 800 B1, column 5.

The present invention also resides in a cladding tube produced according to the method described in any of the preceding embodiments is used in a fuel assembly for a nuclear pressure water reactor. Thereby the above described advantages with such a cladding tube are achieved.

The invention also concerns a cladding tube as such, suitable to contain nuclear fuel for a nuclear pressure water reactor, which cladding tube at least principally consists of a cylindrical tube component of a Zr-based alloy, where the alloying element which, except for Zr, has the highest content in the alloy is Nb, wherein the Nb content in weight percent is between 0.5 and 2.4, wherein said tube component has been finally annealed such that it has a structure such that it is partly recrystallized but not completely recrystallized. The degree of recrystallization in the tube component is higher than 5% and lower than 95%, preferably higher than 40%, for example between 60% and 90%.

Such a cladding tube can be produced according to the above-described method. Advantageous embodiments, for example concerning included alloying elements and alloying contents, are clear from the examples above in connection with the method according to the invention. With these embodiments of the cladding tube, the above-described advantages are achieved.

Finally, the invention also concerns a fuel assembly for a nuclear pressure water reactor. The fuel assembly comprises a plurality of cladding tubes according to the invention filled with nuclear fuel suitable for such cladding tubes for a nuclear pressure water reactor.

SHORT DESCRIPTION OF THE DRAWINGS

DETAILED DESCRIPTION OF PREFERRED EMBODIMENTS OF THE INVENTION

Figure 1:
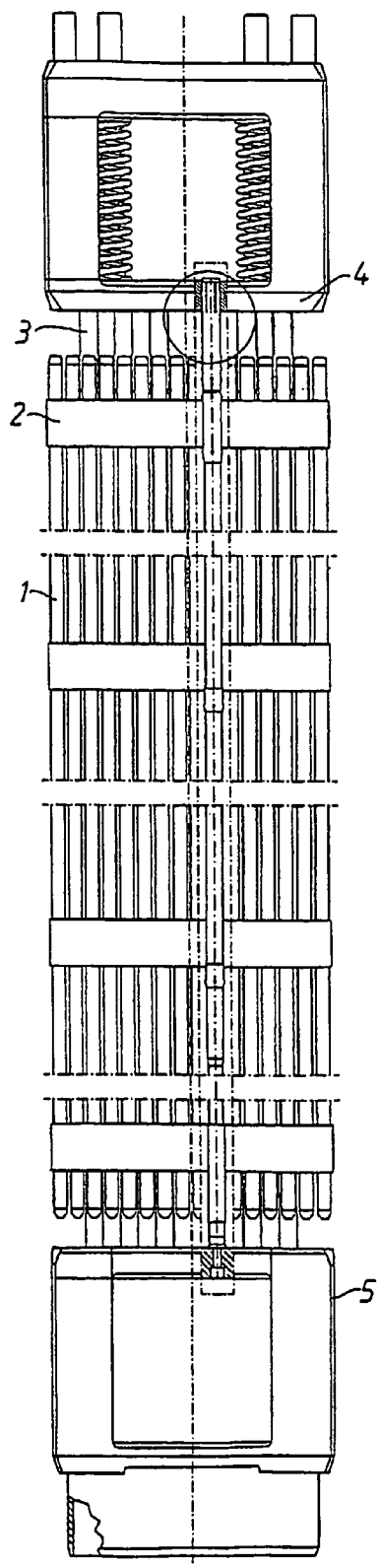
FIG. 1 shows schematically a fuel assembly for a nuclear pressure water reactor.

FIG. 1 shows schematically a fuel assembly for a PWR. The fuel assembly comprises a top plate 4 and a bottom plate 5. Between the top plate 4 and the bottom plate 5 a plurality of guide tubes 3 for control rods extend. Furthermore, the fuel assembly comprises a plurality of cladding tubes 1. These cladding tubes 1 thus contain a nuclear fuel material and are thereby called fuel rods. In this kind of fuel assembly for PWR, the fuel rods do not reach all the way to the top plate 4 and to the bottom plate 5. The fuel rods are kept in position in the fuel assembly with the help of spacers 2.

Figure 2:
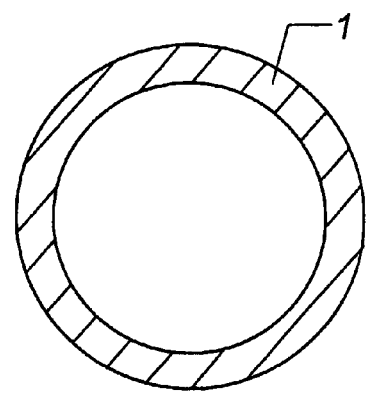
FIG. 2 shows schematically a cross-section through a cladding tube according to the invention.

FIG. 2 shows schematically a cross-section through a cladding tube according to the invention. The cross-section shows the cladding tube strongly enlarged. In reality, the cladding tube is of a dimension and of a length which are suitable for use in a PWR. The cladding tube comprises a cylindrical tube component 1. In the shown case, the cylindrical tube component 1 constitutes the whole cladding tube. This is the preferred embodiment. As has been mentioned above, it is however possible that this tube component 1 has one or more protective layers on its inside or outside. The tube component 1 consists of a Zr-based alloy. This means that the tube component to the largest extent, always more than 95%, consists of Zr. According to an embodiment, the tube component 1 contains the following alloying elements: 1% Nb, 1200 ppm O, 200 ppm Fe, less than 200 ppm C, less than 150 ppm Si, less than 1000 ppm S and in addition to that only impurities of a content which does not exceed that which is normally accepted in Zr or Zr alloys for applications in nuclear reactors. The cladding tube has been finally annealed such that the tube component 1 has a structure such that it is partly recrystallized but not completely recrystallized. The degree of recrystallization may for example be about 85%.

The invention also concerns a method of producing a cladding tube for nuclear fuel for a nuclear pressure water reactor. The method according to the invention may be carried out in the following manner.

A bar of for example the above-mentioned alloy is formed. This bar is heated to between 900° C. and 1300° C. and is thereafter quenched, preferably in water. A billet is extruded from the bar after heating to between 500° C. and 900° C. The billet is cold rolled to a tube in at least two steps (for example in three steps), with heat treatments between them at between 550° C. and 650° C. The tube is final annealed at a temperature and during a time such that the tube component is partly recrystallized but not completely recrystallized. The final anneal may for example be carried out at a temperature of about 490° C. during about two hours. The final anneal is carried out such that a suitable degree of recrystallization is obtained in the tube. This degree of recrystallization ought to be higher than 5% and lower than 95%. A degree of recrystallization of above 40%, for example between 60% and 90% can be suitable, for example a degree of recrystallization of about 85%.

A cladding tube produced according to the method may suitably be used in a fuel assembly in a nuclear PWR.

When a fuel assembly of for example the above-described kind is supplied with a plurality of cladding tubes according to the invention, a fuel assembly according to the invention is thus obtained.

The invention is not limited to the above given examples but may be varied within the scope of the following claims.

The invention claimed is:

1. A method of producing a cladding tube for nuclear fuel for a nuclear pressure water reactor, which method comprises the following steps:

formation of a tube which at least principally consists of a cylindrical tube component of a Zr-based alloy, where the alloying element, except for Zr, which has the highest content in the alloy is Nb, wherein the Nb content in weight percent is between about 0.5 and about 2.4 and wherein no alloying element, except for Zr and Nb, in said alloy, has a content which exceeds about 0.2 weight percent, and finally annealed the cladding tube at a temperature and during a time such that said tube component is partly recrystallized but not completely recrystallized, and wherein said final anneal is carried out such that the degree of recrystallization in said tube component is higher than about 40% and lower than about 95%;

wherein before said final anneal, the method comprises the following steps:

forming a bar of said Zr-based alloy;

heating the bar to between about 900° C. and about 1300° C. and then quenching the bar;

extruding a billet from the bar after heating to between about 500° C. and about 900°C.; and cold rolling the billet into a tube in at least two steps, with heat treatments between them at between about 550° C. and about 650° C.

2. A method according to claim 1, wherein the final anneal is carried out at a temperature which is lower than 550° C.

3. A method according to claim 1, wherein the final anneal is carried out at a temperature which is between about 400° C. and about 540° C.

4. A method according to claim 1, wherein the final anneal is carried out during about 1 h to about 6 h.

5. A method according to claim 1, wherein the Nb content in said alloy is between about 0.8 weight percent and about 1.2 weight percent.

6. A method according to claim 1, wherein said alloy contains between about 800 ppm and about 1700 ppm O.

7. A method according claim 1, wherein said alloy contains between about 50 ppm and about 600 ppm Fe.

8. A method according claim 1, wherein said alloy in addition to Zr contains about 0.8 weight percent to about 1.2 weight percent Nb, about 50 ppm to about 600 ppm Fe, about 800 ppm to about 1700 ppm O, less than about 250 ppm C, less than about 150 ppm Si, less than about 1000 ppm S and in addition to that only impurities of a content which does not exceed that which is normally accepted in Zr or Zr alloys for applications in nuclear reactors.

* * * * *